US008095277B2

(12) United States Patent
Groitzsch et al.

(10) Patent No.: US 8,095,277 B2
(45) Date of Patent: Jan. 10, 2012

(54) METHOD FOR DETERMINING A DIRECTION OF TRAVEL IN A MOTOR VEHICLE

(75) Inventors: Stephan Groitzsch, Weinheim (DE); Yurity Olshansky, Bad Soden (DE); Uwe Herchenröder, Hammersbach (DE); Peter van der Vegte, Friedrichhafen (DE)

(73) Assignee: Continental Teves AG & Co. OMG, Frankfurt (DE)

( * ) Notice: Subject to any disclaimer, the term of this patent is extended or adjusted under 35 U.S.C. 154(b) by 262 days.

(21) Appl. No.: 12/440,929

(22) PCT Filed: Sep. 12, 2007

(86) PCT No.: PCT/EP2007/059561
§ 371 (c)(1),
(2), (4) Date: May 11, 2009

(87) PCT Pub. No.: WO2008/031837
PCT Pub. Date: Mar. 20, 2008

(65) Prior Publication Data
US 2009/0234543 A1 Sep. 17, 2009

(30) Foreign Application Priority Data

Sep. 12, 2006 (DE) .................. 10 2006 043 511
Sep. 12, 2007 (DE) .................. 10 2006 043 419

(51) Int. Cl.
*B60R 22/00* (2006.01)
(52) U.S. Cl. ........................................................ 701/45
(58) Field of Classification Search .................. 701/23, 701/70, 301, 45; 340/436
See application file for complete search history.

(56) References Cited

U.S. PATENT DOCUMENTS

| 3,176,294 | A | 3/1965 | Merlo et al. | |
|---|---|---|---|---|
| 2004/0193351 | A1* | 9/2004 | Takahashi et al. | 701/70 |
| 2009/0070039 | A1* | 3/2009 | Beuschel et al. | 701/301 |

FOREIGN PATENT DOCUMENTS

| DE | 10220566 | 11/2003 |
|---|---|---|
| DE | 102005003194 | 7/2006 |
| EP | 0492642 | 7/1992 |
| EP | 1010596 | 6/2000 |
| GB | 2004158 | 3/1979 |
| WO | WO02062640 | 8/2002 |
| WO | WO2006042512 | 4/2006 |

* cited by examiner

*Primary Examiner* — Faye M. Fleming

(57) ABSTRACT

Disclosed is a method for detecting a direction of travel in a vehicle with a protection system which avoids accidents. When an object is detected in front of the vehicle in the direction of the vehicle and contact between the vehicle and the object is possible, the method triggers a driver-independent braking and/or steering process to prevent contact with the object. In order to avoid incorrect triggering of the protection system, the method further provides that the driver-independent braking and/or steering process is prevented or aborted if reverse travel is detected.

3 Claims, 3 Drawing Sheets

METHOD FOR DETERMINING A DIRECTION OF TRAVEL IN A MOTOR VEHICLE

This application is the U.S. national phase of international application PCT/EP2007/059561 filed Sep. 12, 2007, which designated the U.S. and which claims the benefit of priority of German Patent Application Number 10 2006 043 419.9 filed Sep. 12, 2007 and German Patent Application Number 10 2006 043 511.7 filed Sep. 12, 2006. The contents of each of the aforementioned documents are incorporated herein in their entirety.

The invention relates to a method for detecting a direction of travel in a motor vehicle.

BACKGROUND OF THE INVENTION

Modern motor vehicles usually already have safety systems which, in driving situations in which a collision could occur with an object in the surroundings, actuate safety means which alert the driver to the danger and which can perform interventions into the driving behavior of the vehicle in order to avoid collisions and/or which increase the passive safety, i.e. reduce possible consequences of an accident for the vehicle occupants. A basis for actuating the safety systems is to sense the current driving situation by means of a suitable surroundings sensor system and to perform electronic evaluation of the acquired data with respect to the danger of collisions between the vehicle and the sensed objects. In this context, there is often the problem of the driving situation not being correctly analyzed on the basis of the acquired data relating to the object located in the surroundings of the vehicle. As a result incorrect triggering of the safety means can occur, and this can lead to an adverse effect on the driving comfort and, as for example in the case of an unnecessary braking process, can adversely affect the driving safety.

Sensors which are present in the motor vehicle are used to detect a direction of travel of a motor vehicle in order to avoid additional costs. Safety systems, such as driving stability control systems and vehicle occupant protection systems, for a motor vehicle having at least four wheels have a sensor which generates a yaw rate signal, a sensor which generates a lateral acceleration signal, a sensor which generates a steering angle signal, wheel speed sensors which generate rotational movement signals of the wheels, and a sensor which generates a longitudinal acceleration signal, which can be connected to an anti-lock brake control system and a traction control system and a yaw moment control system, an airbag system or a seat belt system. The seat belt devices can act on the wheel brakes of the brake system and/or the steering system of the motor vehicle.

Most wheel speed sensors which are used in series production today only supply information about the absolute value of the wheel speed, from which it is not possible to derive a direction of travel. Wheel speed sensors with which a direction of rotation can be detected are known but they are seldom used in series-production vehicles owing to the additional costs.

However, since the information on the direction of travel is very important for driving stability control systems or driver assistance systems, said information is generated from other existing variables.

For example, an intervention by the yaw moment control system during reverse travel must be avoided in order to prevent incorrect triggering of the actuators. The detection of reverse travel in the yaw moment control system (ESP systems) is carried out exclusively during cornering since during straight-ahead travel the yaw angle rate $\psi$ hardly differs from zero and therefore a control intervention must not be performed. Reverse travel is detected by comparing the measured yaw angle rate $\psi_{meas}$ with a setpoint yaw angle rate $\psi_{setp}$ which is detected in a vehicle model. If the signs are opposed, and this also applies to the derivatives of the two variables over time, the yaw accelerations, the vehicle is in a bend through which it is traveling in reverse. In addition to the yaw angle rate, the variables of the lateral acceleration sensor and of the steering angle sensor are also included here in the detection of reverse travel (DE 195 15 048 A1).

Detection of reverse travel is also necessary in order to avoid incorrect control operations for a preventive protection system which avoids accidents, has the purpose of performing early detection of motor vehicle collisions and uses a surroundings sensor system. Preventive protection systems by means of which accidents are avoided and the consequences of accidents are reduced generally carry out the following basic steps in this context:

a) detection of an object in front of the vehicle in the direction of the vehicle,
b) detection of possible contact between the vehicle and the object as a function of the relative position with respect to one another,
c) preparation or triggering of a driver-independent braking or steering process as a function of the result of the detection or of possible contact with the object.

In this context, for example a driver-independent, automatic braking intervention or a reduction in the absolute value of the vehicle speed when an object is approaching from the front during reverse travel is counter-productive. Such a situation may occur, for example, if a motor vehicle is traveling in reverse downhill while a vehicle is approaching it from the front at a relatively high speed.

This situation cannot be prevented by the above-described detection of reverse travel with a yaw moment control system since cornering of the motor vehicle is a precondition for detection of reverse travel. The described incorrect triggering can, however, also easily occur during reverse travel with a preventive protection system for the early detection of motor vehicle collisions.

The detection is provided for a motor vehicle with a preventive protection system which avoids accidents and which comprises a plurality of safety devices, in particular also driving stability devices and vehicle occupant protection devices, and in which the safety and vehicle occupant protection devices can be actuated by at least one surroundings sensor system which detects the surroundings of the vehicle and has the purpose of performing the early detection of motor vehicle collisions. Radar sensors and/or infrared sensors as well as camera systems can be used individually or in combination as sensors for sensing the surroundings.

SUMMARY OF THE INVENTION

It would be desirable if a means of detecting reverse travel on the basis of existing signals were also provided for preventive protection systems which have the purpose of performing the early detection of motor vehicle collisions and use a surroundings sensor system for sensing the surroundings of the motor vehicle.

The invention is based on the object of providing a means of detecting reverse travel on the basis of existing sensor signals in a preventive protection system which avoids accidents, has the purpose of performing early detection of motor vehicle collisions and uses a surroundings sensor system for sensing the surroundings of the motor vehicle.

According to the invention, the direction of travel of the vehicle is advantageously detected with the preventive protection system which avoids accidents or a safety system which is connected to the protection system which avoids accidents, and if reverse travel is detected the preventive protection system is deactivated. A driver-independent, automatic braking and/or steering process is therefore prevented or aborted. The invention assigns the detection of reverse travel to a preventive protection system which avoids accidents and which detects the driving situation of the driver's vehicle or acquires information about the driver situation of the driver's vehicle and in doing so relates the relative speed or relative position with respect to a possible collision object to the driving situation of the drivers' own vehicle. In this context, a safety system which is connected to the protection system which avoids accidents can also detect the reverse travel of the vehicle, and the connected safety system here can be arranged internally or externally of the vehicle and communicates in a line-bound or wireless fashion with the protection system which avoids accidents.

The detection of reverse travel is advantageously carried out on the basis of signals of an acceleration sensor and/or of a surroundings sensor which are components of preventive protection systems which avoid accidents or of other safety systems and/or vehicle occupant protection systems and/or driver assistance systems. It is therefore also advantageously possible to integrate the surroundings sensor system of other road users into the detection of the reverse travel if said road users have a vehicle-to-vehicle communication means. Further reverse travel detection sensors such as, for example, sensors which detect the reverse gear speed, the actuation of the reversing lights or the gear shift lever for the reverse gear speed can be used to detect reverse travel or to check its plausibility. It is necessary to take into account here that reverse travel cannot be reliably detected by means of these further sensors alone since, for example, a vehicle can travel downhill in reverse even without a reverse gear speed being engaged.

The problem is also advantageously solved with a protection system which avoids accidents in a motor vehicle and which contains a surroundings sensor system, in that a means for detecting the direction of travel of the motor vehicle is provided with the protection system which avoids accidents, and the protection system which avoids accidents has at least one reverse travel detector, preferably an acceleration sensor and/or a surroundings sensor, for detecting reverse travel. A reverse travel detector is understood to refer to all sensors whose signals can be used to detect reverse travel directly or in a model.

Exemplary embodiments of the invention are illustrated in the drawing and will be described in more detail below.

DESCRIPTION OF EXEMPLARY EMBODIMENTS

Figure 1:
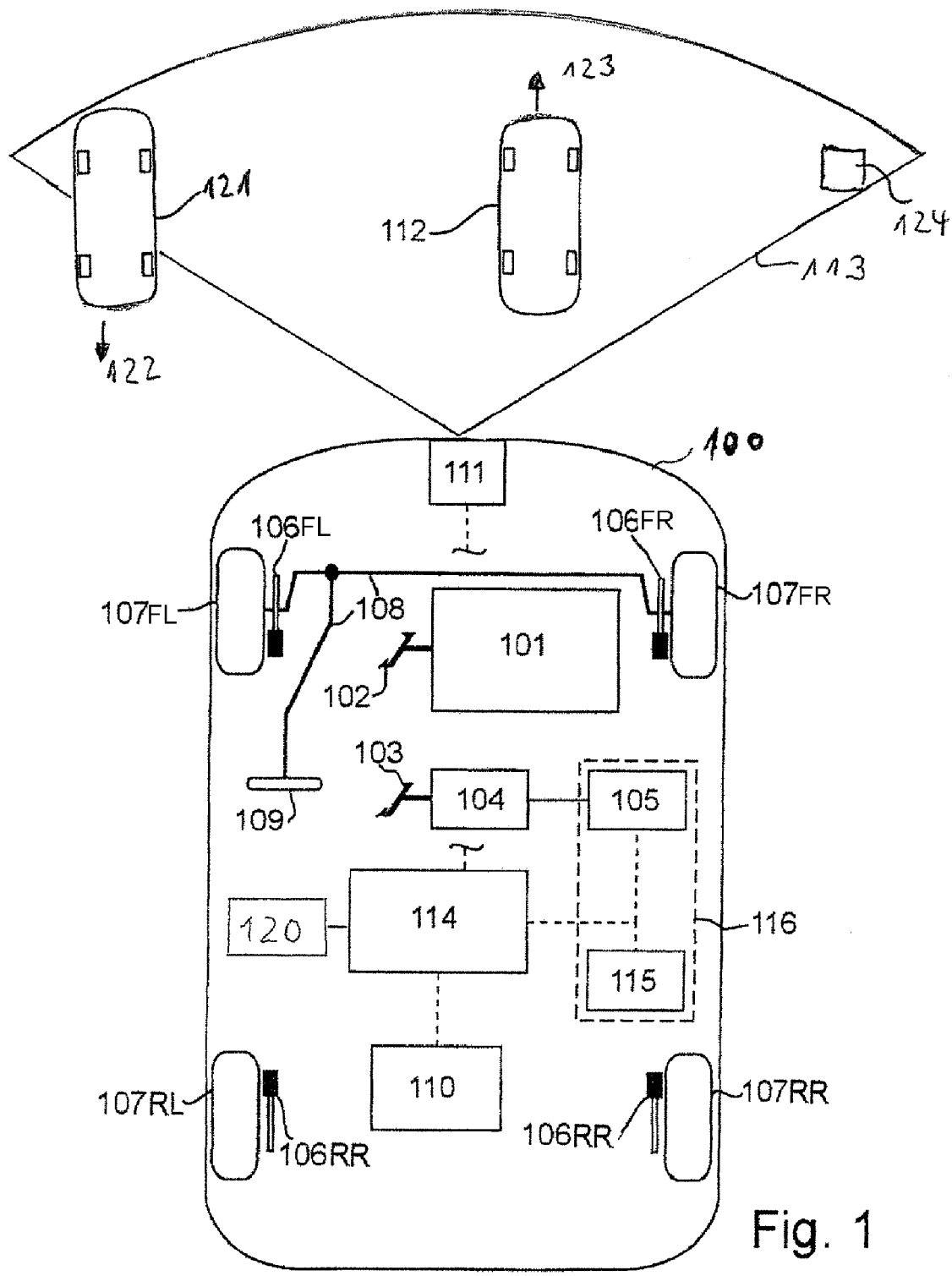
FIG. 1 shows a schematic block illustration of a motor vehicle having a safety system configured according to the invention.

FIG. 1 illustrates a motor vehicle 100 which has a drive engine 101 which is controlled by the driver of the motor vehicle 100 by means of an accelerator pedal 102. A drive torque which is made available by the drive engine 101 is transmitted via a drive train (not illustrated in the figure) to two or to all four wheels of the vehicle 107FL, 107FR, 107RL, 107RR, in order to drive the motor vehicle 100. In the exemplary illustration, the front wheels 107FL, 107FR of the motor vehicle 100 are of steerable design and are connected via a steering train 108 to a steering wheel 109 which can be operated by the driver of the motor vehicle 100. In addition, the motor vehicle 100 has a brake system, which is embodied, for example, as a hydraulic brake system. The brake system is activated by the driver of the motor vehicle 100 by means of a brake pedal 103. As a result of activation of the brake pedal 103, a brake pressure is built up in a master cylinder 104 by means of a brake booster (not illustrated in the figure). The brake pressure can be transmitted to the wheel brakes 106FL, 106FR, 106RL, 106RR via a hydraulic unit 105. Hydraulic lines are provided for this purpose and are not illustrated in FIG. 1 for reasons of clarity. The wheel brakes 106FL, 106FR, 106RL, 106RR comprise a brake piston which is mounted fixed to the vehicle and which is pressed against a brake disk, which is mounted fixed to the wheel, when the wheel brakes 106FL, 106FR, 106RL, 106RR have pressure applied to them, as a result of which a braking moment is generated. The hydraulic unit 105 is of a design which is known per se to a person skilled in the art and it permits driver-independent setting of the brake pressure in the wheel brakes 106FL, 106FR, 106RL, 106RR. In particular, the brake pressure in the wheel brakes 106FL, 106FR, 106RL, 106RR can be increased automatically by means of the hydraulic unit 105.

In addition, the motor vehicle 100 has a driving state sensor system 110. This comprises, in particular, wheel speed sensors from the signals of which the longitudinal speed of the motor vehicle 100 can be determined, a yaw rate sensor for determining the yaw rate of the motor vehicle 100 and, if appropriate, a lateral acceleration sensor and/or longitudinal acceleration sensor for determining the lateral and longitudinal acceleration of the motor vehicle 100. The vehicle state sensor system 110 also preferably comprises a steering angle sensor which is arranged within the steering train 108 and has the purpose of sensing the block angle of the steerable front wheels 107FL, 107FR. In particular the respective current vehicle dynamics state of the motor vehicle 100 can be determined using the measurement data of the vehicle state sensor system 110. Apart from the vehicle state sensor system 110, the motor vehicle 100 also has sensors by means of which the operating state of individual vehicle components can be detected. These are, in particular, an accelerator pedal sensor for sensing the position of the accelerator pedal and a pressure sensor for sensing the brake pressure which is set in the master cylinder 104 of the brake system by the driver. Instead of the pressure sensor, a pedal travel sensor, which senses the position of the brake pedal 103, may also be provided. In particular, the behavior of the driver during the longitudinal guidance of the motor vehicle 100 can be detected by means of the last-mentioned sensors.

In order to sense objects 112, 121, 124 in the surroundings of the motor vehicle 100, the latter also has a surroundings sensor system 111. The surroundings sensor system 111 comprises, for example, one or more wheel sensors with a sensing range 113 which corresponds to a spatial angular range in front of the motor vehicle 100. The radar sensor may be, for example, the sensor of an ACC (adaptive cruise control) system which is provided in the motor vehicle 100 for automatically controlling inter-vehicle distance, which sensor can carry out an added value function within the present invention. Alternatively or additionally to the radar sensor, the surroundings sensor system 111 can contain, for example, an infrared sensor or a video sensor. In addition, the sensing range 113 of the surroundings sensor system 111 can also be extended by means of suitable surroundings sensors in such a way that it additionally covers the lateral surroundings and/or rear surroundings of the motor vehicle 100. The objects 112, 121, 124 in the surroundings which are located in the sensing range 113, and are detected by means of the surroundings sensor system 111 and are relevant in terms of a possible collision with the motor vehicle 100 and with respect to the detection of reverse travel are further motor vehicles 112, 121 which are moving in the road traffic together with the motor vehicle 100, and stationary objects 124. Stationary objects are generally parked vehicles, road signs, crash barriers, roadway demarcations, trees and the like. In order to make a linguistic distinction from the other motor vehicles 112, 121, the motor vehicle 100 is therefore also referred to below as the driver's vehicle 100.

The surroundings sensor system 111 determines the relative position and relative speeds $V_{rel}$, in relation to the driver's vehicle 100, of the objects 112, 121, 124 which are located in the surroundings and in the sensing range 113 of said surroundings sensor system 111. In this context, the position of the objects 112, 121, 124 in the surroundings is the position of reference points of the objects 112 in the surroundings, which is usually the center point, estimated on the basis of the sensor data, of the fronts of the objects facing the driver's vehicle 100. On the basis of the sensor data, a first classification of the sensed objects 112, 121, 124 in the surroundings is also performed in an electronic evaluation system of the surroundings sensor system 111. Here, for example the objects 112, 121 which are in the surroundings and are moving in the road traffic are differentiated from such objects 124 which are in the surroundings and which are located next to the edge of the roadway or near to the roadway on the basis of the sensed movement of the objects 112, 121 in the surroundings and on the basis of the sensed outlines of the objects 112, 121 in the surroundings.

If the surroundings sensor system 111 comprises a video sensor, lane markings can also be sensed and the electronic evaluation system of the surroundings sensor system 111 can determine from their profile the profile of the roadway on which the drivers' vehicle 100 is moving and the objects 112 which are in the surroundings and which are participating in the road traffic are moving. If the lane markings cannot be sensed by means of the surroundings sensor system 111 which is being used, the roadway profile can be estimated using objects 124 which are in the surroundings and which delimit the roadway, for example crash barriers. In addition to this use which is possibly provided, the objects 124 which are in the surroundings and which are not participating in the road traffic are taken into account in order to detect reverse travel of the drivers' own vehicle 100. Therefore, in the text which follows the term objects in the surroundings denotes all objects in the surroundings of the drivers' vehicle 100 which are assumed to be located in the sensing range 113 of the surroundings sensor system.

In the text which follows it is assumed that the surroundings sensor system 111 comprises at least one radar sensor which is directed forward in the longitudinal direction of the vehicle.

Furthermore, the surroundings sensor system 111 makes available measured values, for example the back scatter cross section of a sensed object 112, 121, 124 in the surroundings, which measured values permit conclusions to be drawn about the quality of the detection of the object 112, 121, 124 in the surroundings.

The data which is acquired by means of the previously described sensors are fed, within the drivers' vehicle 100, to a preventive protection system 114 which detects potentially critical driving situations on the basis of these data and determines control instructions in such driving situations for actuating safety devices 116 of the drivers' vehicle 100.

The safety devices 116 comprise the hydraulic unit 105 with which the brake system of the drivers' vehicle 100 can be influenced. It is possible in this context to carry out, for example, an automatic braking process, or the wheel brakes 106FL, 106FR, 106RL, 106RR can be pre-conditioned for a subsequent braking process by, for example, building up a low brake pressure by means of which clearance between the brake pistons and the brake disk is reduced or eliminated. In addition, it is possible to influence thresholds for the triggering of specific functions of the hydraulic unit 105 in order to be able to trigger these functions more quickly if a collision is imminent. An example of such a function is a hydraulic braking assistant (HBA) which is known per se and in which a brake pressure which is set by the driver in the brake system is increased to a maximum value in a critical driving situation in order to ensure maximum deceleration. The function is usually activated if the brake pedal gradient, i.e. the speed at which the driver depresses the brake pedal, or the brake pressure gradient, i.e. the rate of change of the brake pressure within a master cylinder 104 of the brake system, exceeds a predefined triggering threshold value. Reducing this triggering threshold value allows the HBA to be triggered more quickly so that the braking distance of the driver's vehicle 100 is shortened. In addition, or together with the hydraulic unit 105, a steering system which can be actuated automatically, for example a superimposition steering system, can be influenced. This permits automatic steering to be carried out in order to perform an avoidance maneuver around the object 112 in the surroundings.

Further safety devices 116 of the drivers' vehicle 100 are combined schematically in the block 115 in FIG. 1. The safety devices 115 comprise devices for visual, audible or haptic warning of the driver about a possible collision with an object 112 in the surroundings. Visual warnings may be output, for example, by means of a display which can be seen by the driver of the vehicle 100 and/or by means of a warning light, which is arranged, for example, in a dashboard of the drivers' vehicle 100. Audible warnings comprise, for example, warning tones which can be output by means of a loudspeaker or by means of an audio system which is provided in the driver's vehicle 100. Haptic warnings can be output, for example, by means of a steering actuator which is arranged in the steering train 108 in that said steering actuator briefly applies a torque to the steering wheel 109. Alternatively or additionally, the driver's vehicle 100 can also be braked by a brief increase in brake pressure which is implemented by means of the hydraulic unit 105, so that a braking jolt is caused which makes the driver aware of a hazardous situation.

Furthermore, the safety devices 115 preferably comprise one or more devices for increasing the passive safety of the vehicle. In particular, it is possible to use, in this context, reversible seat belt pretensioners with which the seat belts which are applied by the vehicle occupant can be tightened in order to secure the vehicle occupants better in the case of a collision. Furthermore, devices for adjusting the seating position of the vehicle occupants can be provided in the driver's vehicle 100, which devices move the vehicle occupants into a favorable position by adjusting the seats, and devices with which windows and/or a sunroof of the driver's vehicle 100 can be closed when a collision is imminent, in order to provide an enclosed safety cell in the driver's vehicle 100, which protects the driver against injury. In addition, the safety devices 115 can comprise actuators for pre-conditioning irreversible safety devices such as airbags and/or pyrotechnic seat belt pretensioners which reduce the triggering thresholds of the irreversible safety devices, which are generally based on longitudinal acceleration signals, in the case of a possible collision so that the irreversible safety devices respond more quickly if a collision occurs.

1. Detection of Reverse Travel on the Basis of a Longitudinal Acceleration Signal According to one exemplary embodiment, the preventive protection system 114 uses the longitudinal acceleration signal of a longitudinal acceleration sensor 120 to detect reverse travel. Longitudinal acceleration sensors 120 are used in airbag systems, for all-wheel vehicles in electronic brake systems and in further electronic safety or driver assistance systems of motor vehicles. The measured longitudinal acceleration signal $a_{sensor}$ is signed and has a steady-state component and a dynamic component.

The sensing of the steady-state component of the longitudinal acceleration, acting on the driver's vehicle 100, of the sensor signal $a_{sensor}$ results on a longitudinal acceleration sensor 120 which is not orientated horizontally. The reasons for this may be the installation of the sensor 120 or an inclination α of the roadway in the longitudinal direction. A portion which is due to the downhill acceleration is based, for example, on g*sin(α), where g=acceleration of the earth and α=longitudinal inclination angle of the vehicle. The acceleration of the earth usually assumes a value of g≈9.81 m/s², which is also used as the basis here.

In order to determine the steady-state component, the value of the acceleration $α^0_{steady\text{-}state}$, measured in the stationary state of the vehicle with the longitudinal acceleration sensor 120, is stored signed in a memory of the preventive protection system 114.

During starting, the vehicle speed $v_{a\_driv}$ of the driver's vehicle 100 is calculated from the measured longitudinal acceleration $a_{sensor}$ by integration. It is important that the measured longitudinal acceleration signal $a_{sensor}$ previously has the steady-state component $α^0_{steady\text{-}state}$ removed from it. That is to say:

$$v_{a\_driv}(t) = \int (a_{sensor}(t) - α^0_{steady\text{-}state}).$$

The model signal of the vehicle speed $v_{a\_driv}$ of the driver's vehicle 100 is therefore formed from $\int(a_{sensor}(t) - α^0_{steady\text{-}state})$ during a time t of the starting process. This model signal of the vehicle speed $v_{a\_driv}$ models the components of the acceleration and of the deceleration during a time period dt. If the vehicle speed $v_{a\_driv}$ has a positive sign, the vehicle is presumably traveling forward, and if it has an opposite, negative sign the vehicle is presumably traveling in reverse.

In order to check the plausibility of the vehicle speed $v_{a\_driv}$ which is determined from $\int(a_{sensor}(t) - α^0_{steady\text{-}state})$ said vehicle speed $v_{a\_driv}$ is examined to determine whether the absolute value of $|v_{a\_driv}|$ is within specific, predefined speed ranges of $|v_{wh\_driv}|$, i.e. whether the vehicle speed $|v_{a\_driv}|$ which is determined from the longitudinal acceleration signal is in a permissible tolerance range of the vehicle speed $|v_{wh\_driv}|$ which is determined from the wheel speed sensors. For this purpose, the absolute value of the vehicle speed $|v_{wh\_driv\_1\text{-}4}|$ which is formed from all four wheel signals or the minimum wheel speed of one wheel $|v_{wh\_driv\_1}|$ is determined. The difference between the absolute values of the calculated vehicle speeds is used as a quality measure of the above calculation of $v_{a\_driv}$:

$$Q(t) = |v_{a\_driv}(t)| - |v_{wh\_driv}(t)|.$$

In terms of absolute value, small values of Q indicate relatively good reliability of the vehicle speed $v_{a\_driv}$ which is calculated from the longitudinal acceleration in the above-mentioned manner. In particular, small values indicate that the inclination of the roadway has not changed very much during the calculation.

If the vehicle speed exceeds a defined threshold (for example 5 km/h) in terms of absolute value and if the quality measure Q drops below a certain value (for example 2 km/h), the direction of travel is confirmed from the sign of $v_{a\_driv}$.

When reverse travel is confirmed, the connection of the preventive protection system 114 to the safety systems 116 is interrupted or the actuators which engage in the vehicle dynamics are prevented from being actuated by the protection system 114. Of course, the protection system 114 can also actuate the safety systems 116 with a logic system which after determination of forward travel.

When the driver's vehicle 100 is next in the stationary state, the method is restarted.

Further information such as, for example, signals which indicate the reverse gear speed, the actuation of the reversing lights or the gear shift lever for the reverse gear speed, can also be used to check the plausibility of the respective other method of reliably detecting reverse travel.

2. Detection of Reverse Travel on the Basis of the Surroundings Sensor System

Surroundings sensors can be used in driver assistance systems such as adaptive cruise controllers and the preventive protection system 114 which reduces the consequences of accidents or avoids accidents. Said sensors detect objects 112, 121, 124 in the surroundings which are moving in the road traffic with the driver's vehicle 100 or are stationary, and their position and relative speed $v^{rel}$ on the basis of images or reflections. Here, 112 denotes a vehicle which is moving in the same direction with the driver's vehicle 100 during forward travel 123, while the vehicle 121 moves in the same direction 122 during reverse travel of the driver's vehicle 100. "Stationary objects" such as for example 124 are those which do not move relative to the road.

Figure 2:
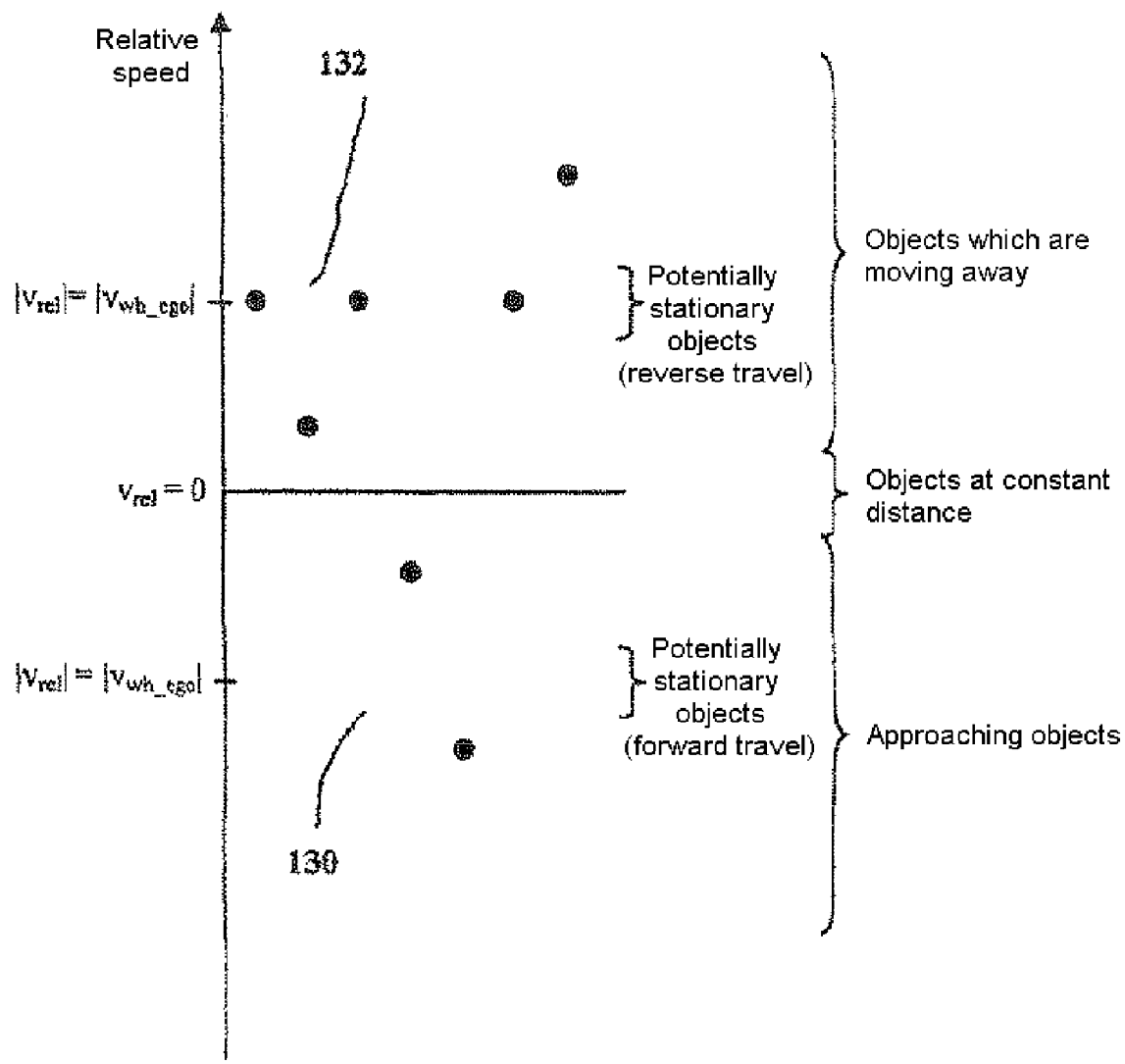
FIG. 2 shows a typical distribution of relative speeds of detected objects in the surroundings during reverse travel with a surroundings sensor on the front of the vehicle.
Figure 3:
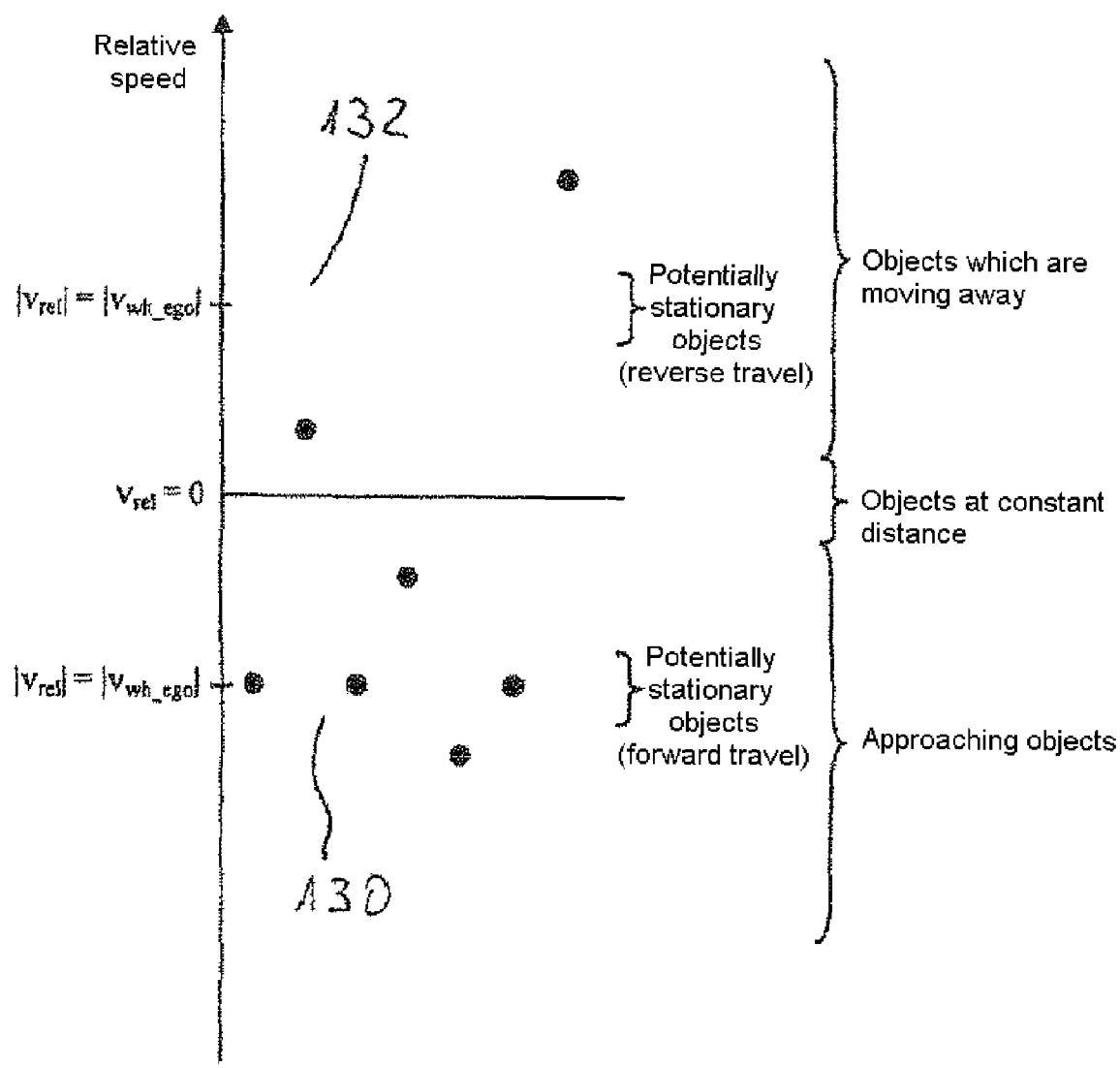
FIG. 3 shows a typical distribution of relative speeds of detected objects in the surroundings during forward travel with a surroundings sensor on the front of the vehicle.

FIGS. 2 and 3 show a schematic sequence of the detection of reverse travel or forward travel with the surroundings sensor 111 which is arranged on the front of the vehicle.

Within the preventive protection system 114, the absolute value of the speed of the driver's vehicle 100 can be determined from all the four wheel sensor signals $|v_{wh\_driv\_1\text{-}4}|$ or from at least one wheel sensor signal $|v_{wh\_driv\_1}|$. The determination of the vehicle speed can, of course, also be made available by safety devices 116 such as anti-lock brake devices or ESP systems which also calculate the vehicle speed from the wheel speed signals.

The objects 112, 121 and 124 in the surroundings of the driver's vehicle 100 are detected and observed during a specific time period dt using the surroundings sensor system 111. The relative speed $v_{rel}$ of the detected objects 112, 121, 124 in the surroundings with respect to the driver's vehicle 100 in the longitudinal direction of the vehicle and its time profile are measured and evaluated. In this context, all the objects 112, 121, 124 in the surroundings whose relative speed $|v_{rel}|$ in terms of absolute value is identical with the vehicle speed $|v_{wh\_driv\_1\text{-}4}|$ or $|v_{wh\_driv\_1}|$ in terms of absolute value over the specific time period dt during travel or in the stationary state are classified as "stationary objects 124 in the surroundings".

Observation over a specific time period is necessary since objects 124 in the surroundings can also briefly have a relative speed which corresponds in terms of absolute value to the speed of the driver's vehicle 100 if they are not stationary. This can occur whenever the observed object, for example 112 or 121, in the surroundings happens to move at twice the speed of the driver's vehicle 100 in the direction of its longitudinal axis. However, this situation will generally not occur over a relatively long time period, and will in particular not occur if the speed of the driver's vehicle 100 changes.

The duration of the time period dt up to the classification as stationary can be shortened if the speed $v_{wh\_driv}$ of the driver's vehicle 100 changes, but the speed condition for the classification as a "stationary object 124 in the surroundings" continues to be met, i.e. the relative speed in terms of absolute value of the object 124 in the surroundings will correspondingly continue to be identical with the "changed" vehicle speed $v_{wh\_driv}$ of the driver's vehicle.

While the driver's vehicle 100 is traveling, "stationary" objects 124 in the surroundings will continue to be classified on the basis of relative speed and/or distance. Objects 124 in the surroundings whose distance from the driver's vehicle 100 becomes larger are classified as "stationary, moving away" in 132. The "stationary" objects in the surroundings whose distance from the driver's vehicle becomes smaller are classified as "stationary/approaching" in 130.

FIGS. 2 and 3 are schematic illustrations of a corresponding process of assignment to classes, within which the objects 112, 121, 124 in the surroundings are represented by means of dots. Here, in FIG. 2 objects 124 in the surroundings which are stationary and moving away from the driver's vehicle 100 and whose absolute values $|v_{rel}|=|v_{wh\_driv}|$ are assigned to the class 132, while no objects in the surroundings are assigned to the class 130, that is to say "stationary, approaching". The objects 112, 121 which are in the surroundings and which are between the classes 130 and 132 do not meet the condition for a stationary object in the surroundings $|v_{rel}|=|v_{wh\_driv}|$.

FIG. 3 shows a different classification of the stationary objects 124 in the surroundings from that in FIG. 2. Here, the driver's vehicle 100 approaches the stationary objects 124 in the surroundings. The stationary objects in the surroundings are assigned to class 130.

The preventive protection system 114 then determines reverse travel with a front sensor 111 which is provided in the present exemplary embodiment under the following conditions:

The number of objects 124 in the surroundings which are classified as "stationary/moving away" exceeds a specific number since the last time the vehicle was stationary and/or The time period in which objects 124 in the surroundings have been classified as "stationary/moving away" after the last time the vehicle was stationary exceeds a specific time period and The time period in which objects 124 in the surroundings have been classified as "stationary/approaching" after the last time that the vehicle was stationary is less than a specific time period.

It is self-evident and requires no further description that the previously described method with a front sensor can also be carried out with a surroundings sensor provided on the rear, in which case inverted logic applies to objects 124 in the surroundings which are moving away or approaching.

With respect to starting, the method can take forward travel or, conversely, reverse travel as its basis. Taking reverse travel as a basis, forward travel is detected by evaluation of the signals relating to the surroundings, and taking forward travel as a basis reverse travel is detected by evaluation of the signals relating to the surroundings.

According to a further exemplary embodiment, for example another vehicle which is located in the surroundings of the driver's vehicle 100 detects and, via vehicle-to-vehicle communication is made available to the driver's vehicle 100 as information indicating whether the vehicle is moving forward or in reverse.

The invention claimed is:

1. A method for detecting a direction of travel in a vehicle with a preventive protection system (114), comprising:
    a) detection of an object (112, 121, 124) in the surroundings in front of the vehicle in the direction of the vehicle;
    b) determination of possible contact between the vehicle (100) and the object in the surroundings as a function of the relative position and the speed with respect to one another;
    c) triggering of a driver independent braking and/or steering process as a function of the result of the determination with respect to possible contact with the object in the surroundings;
    e) determination of the direction of travel of the vehicle with the preventive protection system (114) or an internal or external safety device (116) which is connected to the preventive protection system; and
    f) prevention or aborting of the driver independent braking and/or steering process if reverse travel is detected.

2. The method as claimed in claim 1 wherein the detection of reverse travel is carried out on the basis of signals of at least one of a longitudinal acceleration sensor (120) and a surroundings sensor (111).

3. A preventive protection system for a motor vehicle, comprising:
    a plurality of safety devices; and
    a protection system (114) having at least one reverse travel detector comprising at least one of an acceleration sensor (120) and a surroundings sensor (111) for determining reverse travel and wherein the protection system prevents the plurality of safety devices from actuating while reverse travel is detected.

* * * * *